(12) United States Patent
Vassilieva et al.

(10) Patent No.: US 9,654,223 B2
(45) Date of Patent: May 16, 2017

(54) SUPERCHANNEL POWER PRE-EMPHASIS BASED ON TRANSMISSION CRITERIA

(71) Applicant: Fujitsu Limited, Kawasaki-shi, Kanagawa (JP)

(72) Inventors: Olga Vassilieva, Plano, TX (US); Inwoong Kim, Allen, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/963,022

(22) Filed: Dec. 8, 2015

(65) Prior Publication Data

US 2016/0315712 A1    Oct. 27, 2016

Related U.S. Application Data

(60) Provisional application No. 62/151,815, filed on Apr. 23, 2015.

(51) Int. Cl.
*H04B 10/564* (2013.01)
*H04J 14/02* (2006.01)

(52) U.S. Cl.
CPC .......... *H04B 10/564* (2013.01); *H04J 14/021* (2013.01); *H04J 14/0201* (2013.01); *H04J 14/0221* (2013.01)

(58) Field of Classification Search
CPC ..... H04B 10/564; H04J 14/02–14/0205; H04J 14/021; H04J 14/0212; H04J 14/0221
See application file for complete search history.

(56) References Cited

U.S. PATENT DOCUMENTS

| | | | |
|---|---|---|---|
| 5,546,210 A | 8/1996 | Chraplyvy et al. | |
| 5,579,145 A | 11/1996 | Bogdan et al. | |
| 5,784,170 A | 7/1998 | Park | |
| 6,118,561 A | 9/2000 | Maki | |
| 8,009,985 B1 | 8/2011 | Roberts | |
| 2004/0131353 A1 | 7/2004 | Cannon et al. | |
| 2006/0034610 A1* | 2/2006 | Akiyama | H04J 14/0204 398/83 |
| 2008/0316937 A1 | 12/2008 | Shi | |
| 2010/0007355 A1 | 1/2010 | Olgaard | |

(Continued)

OTHER PUBLICATIONS

Igarashi et al., "Bit-error Rate Performance of Nyquist Wavelength-Division Multiplexed Quadrature Phase-Shift Keying Optical Signals", Optical Society of America, 3 pages, 2011.

(Continued)

*Primary Examiner* — Li Liu
(74) *Attorney, Agent, or Firm* — Baker Botts L.L.P.

(57) ABSTRACT

Methods and systems for superchannel power pre-emphasis based on transmission criteria may determine a guardband used when transmitting multiple superchannels over an optical transport network. The guardband values may depend on various transmission criteria, such as a reach distance for the superchannels and a number of reconfigurable add-drop multiplexer nodes over a given optical path. An amount of power pre-emphasis for each superchannel may then be determined based on the actual guardband values used. Certain values used for superchannel power pre-emphasis based on transmission criteria may be pre-calculated and stored in advance.

16 Claims, 5 Drawing Sheets

(56) References Cited

U.S. PATENT DOCUMENTS

| | | | |
|---|---|---|---|
| 2012/0269506 A1 | 10/2012 | Vassilieva | |
| 2013/0142510 A1* | 6/2013 | Zhou | H04J 14/0208 |
| | | | 398/48 |
| 2013/0142516 A1* | 6/2013 | Zhou | H04J 14/0221 |
| | | | 398/83 |
| 2013/0322877 A1 | 12/2013 | Geyer | |
| 2014/0314416 A1* | 10/2014 | Vassilieva | H04B 3/32 |
| | | | 398/76 |
| 2016/0344481 A1* | 11/2016 | Vassilieva | H04J 14/0221 |

OTHER PUBLICATIONS

Bosco et al., "Performance Limits of Nyquist-WDM and CO-OFDM in High-Speed PM-QPSK Systems", IEEE Photonics Technology Letters, vol. 22, No. 15, pp. 1129-1131, Aug. 1, 2010.

* cited by examiner

SUPERCHANNEL POWER PRE-EMPHASIS BASED ON TRANSMISSION CRITERIA

CROSS-REFERENCE TO RELATED APPLICATIONS

This application claims priority from U.S. Provisional Application No. 62/151,815 filed Apr. 23, 2015, entitled "SUPERCHANNEL POWER PRE-EMPHASIS BASED ON TRANSMISSION CRITERIA".

BACKGROUND

Field of the Disclosure

The present disclosure relates generally to optical communication networks and, more particularly, to superchannel power pre-emphasis based on transmission criteria.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency.

SUMMARY

In one aspect, a disclosed method is for superchannel power pre-emphasis based on transmission criteria. The method may include, for at least two superchannels being transmitted over an optical transmission path, determining a minimum guardband for the superchannels, the minimum guardband being respectively correlated with a number of reconfigurable optical add-drop multiplexers (ROADM) nodes in the optical transmission path. The method may also include, determining an additional guardband respectively correlated with a reach of the optical transmission path. When the additional guardband is greater than the minimum guardband, the method may include determining a power pre-emphasis respectively for each optical subcarrier in the superchannels, the power pre-emphasis being respectively correlated with guardband values. The method may also include applying the power pre-emphasis respectively to each of the optical subcarriers, including modifying an optical power level for at least some of the optical subcarriers, and, after applying the power pre-emphasis, transmitting the superchannels over the optical transmission path.

In any of the disclosed embodiments of the method, when the additional guardband is less than or equal to the minimum guardband, the method may include transmitting the superchannels over the optical transmission path without applying power pre-emphasis.

In any of the disclosed embodiments of the method, the additional guardband may be respectively correlated with an optical signal-to-noise ratio (OSNR) margin for the superchannels over the optical transmission path.

In any of the disclosed embodiments, the method may further include precalculating values for the minimum guardband versus the number of ROADM nodes, and storing the values precalculated for the minimum guardband in a repository, while determining the minimum guardband may further include retrieving the values precalculated for the minimum guardband from the repository.

In any of the disclosed embodiments, the method may further include precalculating values for the additional guardband versus the reach of the optical transmission path, and storing the values precalculated for the additional guardband in a repository, while determining the additional guardband may further include retrieving the values precalculated for the additional guardband from the repository.

In any of the disclosed embodiments, the method may further include precalculating values for the power pre-emphasis versus the guardband values for each of the optical subcarriers, and storing the values precalculated for the power pre-emphasis in a repository, while determining the power pre-emphasis may further include retrieving the values precalculated for the power pre-emphasis from the repository.

In any of the disclosed embodiments of the method, transmitting the superchannels over the optical transmission path may include adding the additional guardband to the bandwidth of the superchanels.

In another aspect, a disclosed network management system is for superchannel power pre-emphasis based on transmission criteria. The network management system may include a processor enabled to access a memory media storing instructions executable by the processor. In the network management system, the instructions may be executable to, for at least two superchannels being transmitted over an optical transmission path, determine a minimum guardband for the superchannels, the minimum guardband being respectively correlated with a number of reconfigurable optical add-drop multiplexers (ROADM) nodes in the optical transmission path. In the network management system, the instructions may also be executable to determine an additional guardband respectively correlated with a reach of the optical transmission path. When the additional guardband is greater than the minimum guardband, the instructions may be executable to determine a power pre-emphasis respectively for each optical subcarrier in the superchannels, the power pre-emphasis being respectively correlated with guardband values, and apply the power pre-emphasis respectively to each of the optical subcarriers, including modifying an optical power level for at least some of the optical subcarriers. In the network management system, after applying the power pre-emphasis, the instructions may be executable to transmit the superchannels over the optical transmission path.

In any of the disclosed embodiments of the network management system, when the additional guardband is less than or equal to the minimum guardband, the instructions may also be executable to transmit the superchannels over the optical transmission path without applying power pre-emphasis.

In any of the disclosed embodiments of the network management system, the additional guardband may be respectively correlated with an optical signal-to-noise ratio (OSNR) margin for the superchannels over the optical transmission path.

In any of the disclosed embodiments of the network management system, the instructions may be executable to precalculate values for the minimum guardband versus the number of ROADM nodes, and store the values precalculated for the minimum guardband in a repository, while the instructions to determine the minimum guardband may further include instructions to retrieve the values precalculated for the minimum guardband from the repository.

In any of the disclosed embodiments of the network management system, the instructions may be executable to precalculate values for the additional guardband versus the reach of the optical transmission path, and store the values precalculated for the additional guardband in a repository, while the instructions to determine the minimum guardband may further include instructions to retrieve the values precalculated for the additional guardband from the repository.

In any of the disclosed embodiments of the network management system, the instructions may be executable to precalculate values for the power pre-emphasis versus the guardband values for each of the optical subcarriers, and store the values precalculated for the power pre-emphasis in a repository, while the instructions to determine the minimum guardband may further include instructions to retrieve the values precalculated for the power pre-emphasis from the repository.

In any of the disclosed embodiments of the network management system, the instructions to transmit the superchannels over the optical transmission path may further include instructions to add the additional guardband to the bandwidth of the superchanels.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Figure 1:
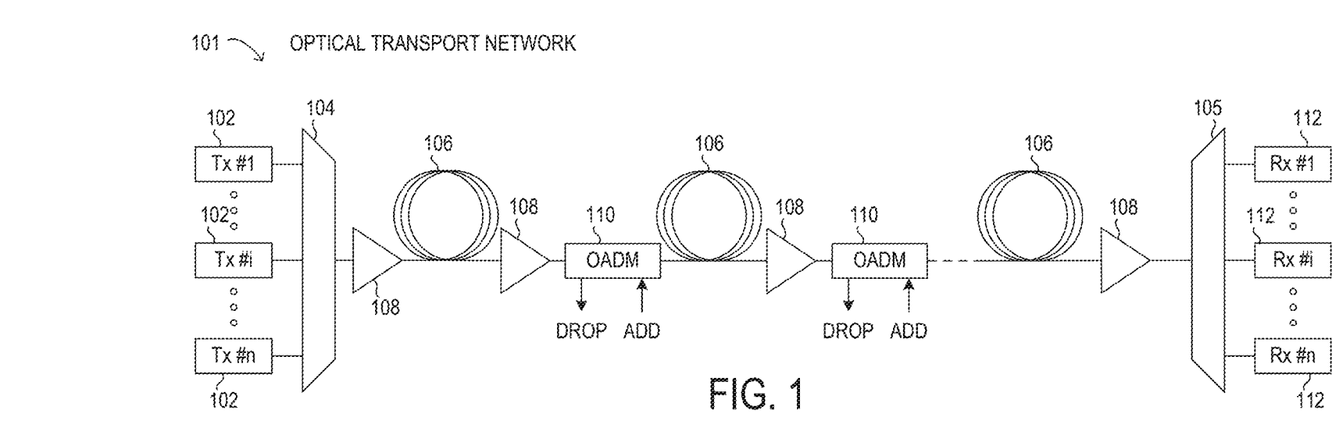
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the Baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarrier signals (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may be used to transmit a superchannel at very high data rates. In order to minimize linear crosstalk between neighboring subcarriers in the superchannel, Nyquist filtering may be applied at the transmitter side to shape the subcarrier frequency bands (see also FIG. 2). As noted above, optical superchannels may represent a promising solution for transmission of signals at 400 Gb/s and 1 Tb/s data rate per channel. Various transmission experiments with superchannels have revealed that each subcarrier within a superchannel may experience different amounts of linear and non-linear interactions with neighboring subcarriers, resulting in different received OSNR penalties. It has been reported that subcarriers in a superchannel may exhibit different degrees of bit rate error (BER), and accordingly OSNR, which may be observed at receivers 112. For example, subcarriers in a central band of the superchannel may suffer from larger BER due to non-linear interaction compared to subcarriers in an edge band of the superchannel. Such a variance in BER among the subcarriers of a superchannel may be undesirable for an operator of optical transport network 101. The operator (or network service provider) of optical transport network 101 may desire uniform performance for every transmitted channel for operational and economic reasons.

Thus, in certain embodiments, optical transport network 101 may implement variable subcarrier power levels to reduce or eliminate an OSNR variance among subcarriers of a superchannel. In order to compensate for such effects, a variable subcarrier power level adjustment method, referred to herein as "power pre-emphasis", may lower transmitted power levels for certain intermediate subcarriers bands. In other words, certain intermediate subcarrier bands may be attenuated to transmit at a lower power levels with the superchannel. Because OSNR is proportional to fiber input power, reduction of power may slightly reduce OSNR for an individual subcarrier. However, the power level reduction of an intermediate subcarrier in a superchannel may also reduce intra-subcarrier non-linear interactions that result in OSNR degradation in neighboring subcarriers. In this manner, slightly lower OSNR may be intentionally induced on certain subcarriers in the superchannel band, while non-linear crosstalk effects may be significantly reduced. Such power pre-emphasis may result in overall reduced OSNR degradation, when viewed across all subcarriers in the superchannel, and may further equalize OSNR penalties for all subcarriers.

Figure 2:
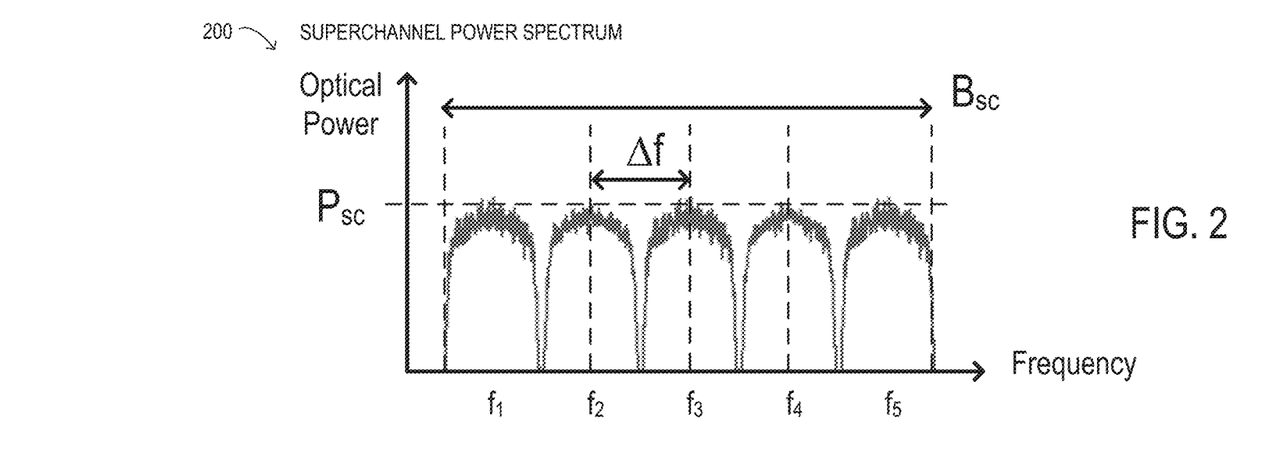
FIG. 2 shows selected elements of an embodiment of a superchannel power spectrum.

Referring to FIG. 2, selected elements of an embodiment of a superchannel is shown as superchannel power spectrum 200, which depicts five (5) subcarriers. While the data used for superchannel power spectrum 200 are not actual measured values, the illustrated power spectrum may be characteristic of an actual superchannel. In superchannel power spectrum 200, the subcarriers may each be modulated with 200 GB/s DP-16-QAM signals. Furthermore, each subcarrier band has been subject to electrical Nyquist pulse shaping in the transmitter using a root raised cosine method using a roll-off factor of 0.15. As shown in FIG. 2, $B_{SC}$ represents the fixed superchannel transmission band, while Δf represents the subcarrier frequency spacing. In certain embodiments, the subcarrier frequency spacing Δf may be 35 GHz and may be uniform between each center frequency $f_1$, $f_2$, $f_3$, $f_4$, and $f_5$, respectively corresponding to the subcarrier bands. The subcarrier frequency spacing Δf may be selected to be wide enough to prevent any significant linear crosstalk between adjacent subcarriers. The optical signal of each subcarrier may be multiplexed using an optical coupler to form the single superchannel in the fixed transmission band $B_{SC}$ having an aggregate data rate of 1 Tb/s, for example. It is noted that different values for the fixed superchannel transmission band, $B_{SC}$, the subcarrier frequency spacing Δf, and the overall aggregate data rate may result in superchannel power spectrum 200. Also shown in FIG. 2 is constant power level, $P_{SC}$, that is a power level for the superchannel that is substantially similar or equal for each of the 5 subcarrier bands, such that $P_{SC}$, may correspond to an average power level for each of the subcarrier bands.

In typical DWDM networks, it is known that system performance may depend on an allocation of each wavelength channel on the wavelength grid, such that a longer wavelength channel may suffer from smaller non-linear impairments compared to a shorter wavelength channel. In case of superchannel-based WDM systems, in addition to the wavelength dependency of the subcarrier error rate across the transmission band, such as the C-band, a dependency of individual subcarrier error rate (or OSNR at the receiver) on spectral allocation of the subcarrier within the superchannel has now been observed in the form of non-linear impairments (such as cross-talk). Linear cross-talk may be observed between two adjacent subcarrier bands (inter-subcarrier) and may depend on a degree or extent of overlap in the frequency domain of the adjacent subcarrier bands. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarrier bands (spectral pulses) that do not substantially overlap each other in the frequency domain. Non-linear cross-talk may also be observed and may arise from non-linear interactions during fiber transmission.

The non-linear interactions may include phenomena such as cross-phase modulation (XPM), self-phase modulation (SPM), and four-wave mixing, among others. Cross-phase modulation may occur when phase information, amplitude information, or both from one channel is modulated to an adjacent channel in the superchannel. Self-phase modulation may arise when a variation in the refractive index (or a dependency of the refractive index on intensity) results in a phase shift within each subcarrier. In four-wave mixing, three wavelengths may interact to create a fourth wavelength that may coincide with a wavelength of a subcarrier, and may lead to undesirable variations in peak power or other types of signal distortion on the affected subcarrier. Furthermore, non-linear cross-talk may comprise inter-subcarrier components. Since non-linear interactions occur during fiber transmission and may not depend on a degree of overlap of the subcarrier frequency bands, Nyquist pulse shaping may be ineffective in resolving problems with non-linear cross-talk in a superchannel.

For single superchannels, at least some of the subcarrier bands depicted in simulated frequency spectrum 200 may be adjusted with lower power levels using power pre-emphasis, compared to $P_{SC}$, to reduce the variation in OSNR between the individual subcarrier bands. Furthermore, when a superchannel is transmitted through one or more ROADM nodes, the edge subcarriers in the superchannel may suffer degradation resulting from passband narrowing (PBN). Therefore, some amount of spectral guardband may be used to minimize the impact of PBN, at the cost of some increase in transmission bandwidth ($B_{SC}$). The actual spectral width of the guardband may be allocated depending on an actual number of ROADM nodes and filter bandwidth that the superchannel is expected to encounter during transmission, which is generally known and can be estimated.

However, when multiple superchannels are transmitted over an optical transmission path without a guardband between the individual superchannels, each subcarrier may experience both linear and non-linear interactions. In such a case OSNR penalties may be relatively high due to the narrow subcarrier spectral spacing and may limit the reach of the supercarriers over the optical transmission path. In this situation, it has been determined that power pre-emphasis is generally ineffective and is not recommended for this reason.

Recently it has been observed from simulation results that when a minimum or no guardband in used with multiple superchannels, the OSNR penalties may be large due to both inter- and intra-superchannel nonlinear crosstalk. In such a situation, power pre-emphasis is not expected to lower the OSNR penalties. However, when larger guardbands are used, the reach of the center subcarriers may be limited by high intra-superchannel nonlinear crosstalk, which can be addressed using a guardband. Thus, with larger guardbands, power pre-emphasis may improve overall OSNR and may improve reach for multiple superchannels. It is noted that the improvement provided by power pre-emphasis in such cases may level off after a certain spectral width of the guardband has been applied, and thus, power pre-emphasis may cease to provide additional improvement for even larger guardbands after some point.

Figure 3:
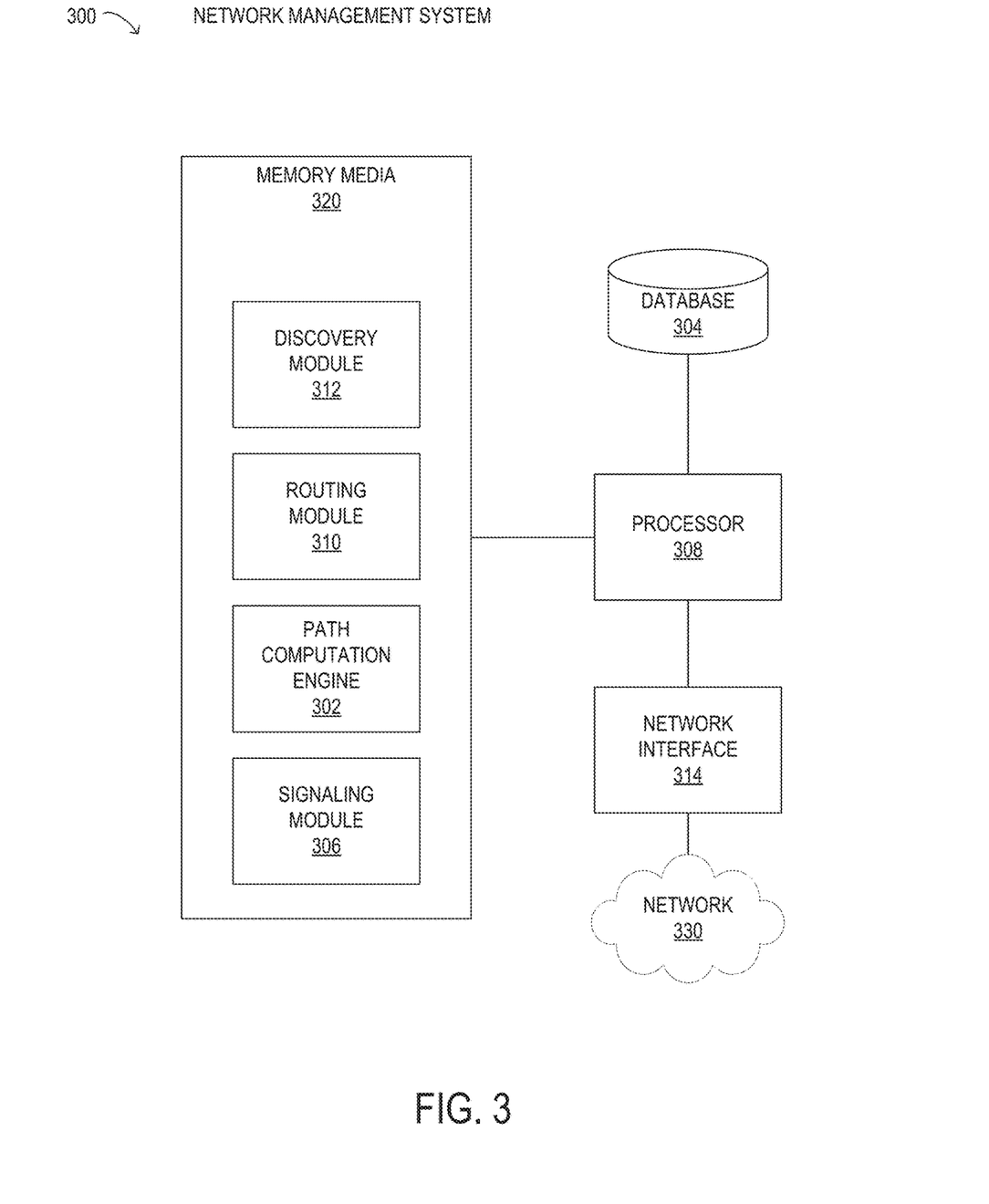
FIG. 3 is a block diagram of selected elements of an embodiment of an optical control plane system for superchannel subcarrier monitoring.

Referring now to FIG. 3, a block diagram of selected elements of an embodiment of control system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, control system 300 includes processor 308 and memory media 320, which may store executable instructions (i.e., executable code) that may be executable by processor 308, which has access to memory media 320. Processor 308 may execute instructions that cause control system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with control system 300 in FIG. 3 is network interface 314, which may be a suitable system, apparatus, or device operable to serve as an interface between processor 308 and network 330. Network interface 314 may enable control system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, control system 300 may be configured to interface with a person (a user) and receive data about the optical signal transmission path. For example, control system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical transport network 101. For example, when an ingress node in the optical network receives a service request, control system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of control system 300, transmission parameters for one or more superchannels may be calculated when a desired optical network path has been provisioned. The transmission parameters may include a guardband and a certain amount of power pre-emphasis for certain subcarriers in a superchannel. As will be described in further detail, the selection of the power pre-emphasis may be dependent on the guardband, among other transmission criteria.

As noted above, when multiple superchannels are transmitted over an optical network path without a guardband in between the individual superchannels, each of the subcarriers may experience equal linear and nonlinear interaction. In this situation, selective methods of power pre-emphasis may not be useful in reducing OSNR penalties and is not recommended. Furthermore, when the optical network path includes multiple ROADM nodes, edge subcarriers in a superchannel may suffer from PBN, in which the ROADM node acts as a bandpass filter that may disproportionally affect edge subcarriers. The effect of PBN may be directly related to a number of ROADM nodes traversed by a superchannel. For this reason, some guardband may be desirable and a desired guardband spectral width (e.g. in GHz) may depend on a number of ROADM nodes in the optical network path traversed by the multiple (or successive) superchannels that are transmitted together. By using network simulations, a width for the guardband may be estimated for given network and transmission criteria, as explained in further detail below.

Figure 4:
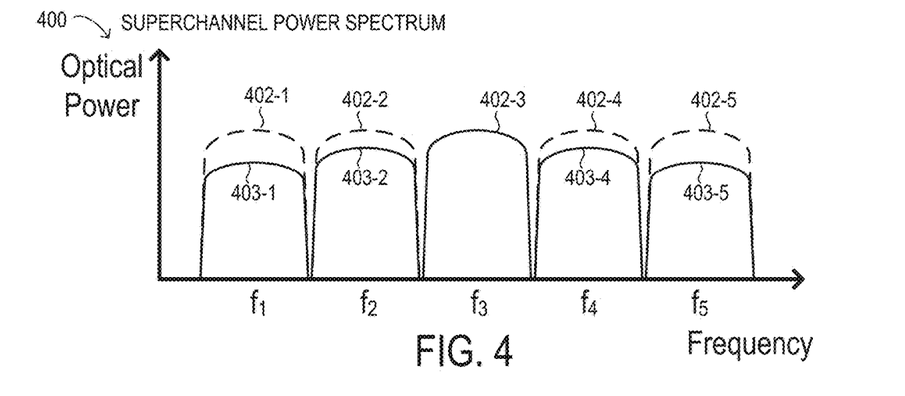
FIGS. 4-7 are selected elements of embodiments of superchannel power spectra.

Referring now to FIG. 4, selected elements of an embodiment of a superchannel is shown as superchannel power spectrum 400, which depicts five (5) subcarriers 402. As shown in FIG. 4, subcarriers 402 are depicted in simplified form for descriptive clarity, yet may still correspond to the subcarrier bands depicted in simulated frequency spectrum 200 (see FIG. 2). In superchannel power spectrum 400, subcarrier bands 402-1 and 402-5 are designated as "edge bands" or "edge subcarriers" or "edge subcarrier bands" in reference to their edge positions within the superchannel subcarrier bands, and may define an overall fixed bandwidth of the superchannel. In the arrangement shown in FIG. 4 with 5 subcarrier bands (i.e., an odd number of subcarrier bands), subcarrier band 402-3 is designated a center subcarrier band, such that the frequency $f_3$ of subcarrier band 402-3 is given by the average value of frequencies $f_1$ and $f_5$. The remaining subcarrier bands 402-2 and 402-4 are termed "intermediate bands" or "intermediate subcarriers" or "intermediate subcarrier bands". As shown in superchannel power spectrum 400, power pre-emphasis may be applied to edge subcarrier bands 402-1, 402-5 and intermediate subcarrier bands 402-2, 402-4. Center subcarrier band 402-3, when present in a super-carrier having an odd number of subcarriers, may be omitted from the power pre-emphasis.

Specifically, a first power pre-emphasis may be performed to edge bands 401-1, 402-5 to result in adjusted edge bands 403-1, 403-5, which may be symmetrically adjusted with respect to center band 402-3 (or a center frequency of the superchannel). Also, a second power pre-emphasis may be performed to intermediate bands 402-2, 402-4 to result in adjusted intermediate bands 403-2, 403-4, which may also be symmetrically adjusted within the superchannel. As a result of the power pre-emphasis, non-linear inter-subcarrier impairments to subcarrier bands $f_2$, $f_3$, and $f_4$ may be significantly reduced, while certain OSNR degradation is imposed on subcarrier bands $f_1$, $f_2$, $f_4$ and $f_5$, when all five subcarrier bands are transmitted as a superchannel. The amount of increase of OSNR degradation may be relatively small compared to the decrease of non-linear cross-talk achieved in this manner. In addition, as a result of the power pre-emphasis, OSNR penalties induced by other non-linear intra-subcarrier impairments, such as self-phase modulation (SPM), to subcarriers $f_1$, $f_2$, $f_4$ and $f_5$ may be also reduced. Thus, the overall variation of OSNR penalties among all the subcarriers of the superchannel may be reduced.

Variation of subcarrier power levels may be achieved in one embodiment using a variable optical attenuator (VOA) for each subcarrier, for example, immediately prior to combination (i.e., multiplexing) into the superchannel. Another implementation may use wavelength selective switches (WSS) having optical power equalization functionality to selectively attenuate power levels in subcarriers along the transmission path. A desired power adjustment per subcarrier may be pre-calculated using various parameters and information, such as channel spacing, a number of channels and certain fiber parameters (i.e., dispersion parameters, non-linear coefficients, and effective fiber lengths). Such parameters and other information about the optical network may be stored in a database and extracted by Path Computation Engine (PCE) 302 (see FIG. 3). Then, instructions may be transmitted to respective optical devices to implement the desired power level per subcarrier. The optical devices receiving instructions to set the subcarrier power level may include VOAs and WSSs in the optical network, such as optical transport network 101 in FIG. 1.

Although the example spectra of a superchannel depicted herein are shown with 5 subcarrier bands, it is noted that the methods described herein may be practiced on superchannels having different numbers of subcarrier bands. For example, when the superchannel has an even number of subcarriers, such as 4, 6, 8, 10, etc., the intermediate bands may comprise all the subcarrier bands except the two edge subcarrier bands, since no center subcarrier band is present. The center band (when present) may be omitted from application of power pre-emphasis in various superchannel configurations. Also, in instances where a number of adjusted subcarrier bands, optionally including intermediate subcarrier bands and edge subcarrier bands, is four or more, a magnitude of the power pre-emphasis may depend on a position of an adjusted subcarrier band within the superchannel. As noted above, the first adjusted power level of edge bands 403-1, 403-5 may be different than the second adjusted power level of intermediate bands 403-2, 403-4.

Figure 5:
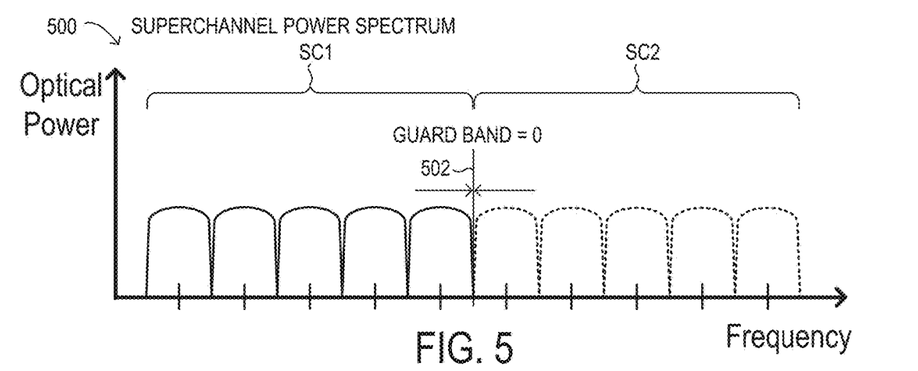

Referring now to FIG. 5, selected elements of an embodiment of a superchannel is shown as superchannel power spectrum 500, which depicts two superchannels, SC1 and SC2, that have been spectrally concatenated to form a single superchannel. In superchannel power spectrum 500, no guardband 502 has been allocated between SC1 and SC2 (GB=0). For the case of GB=0, or for smaller guardbands, performing power pre-emphasis is not expected to improve the OSNR margin and may be omitted.

Figure 6:
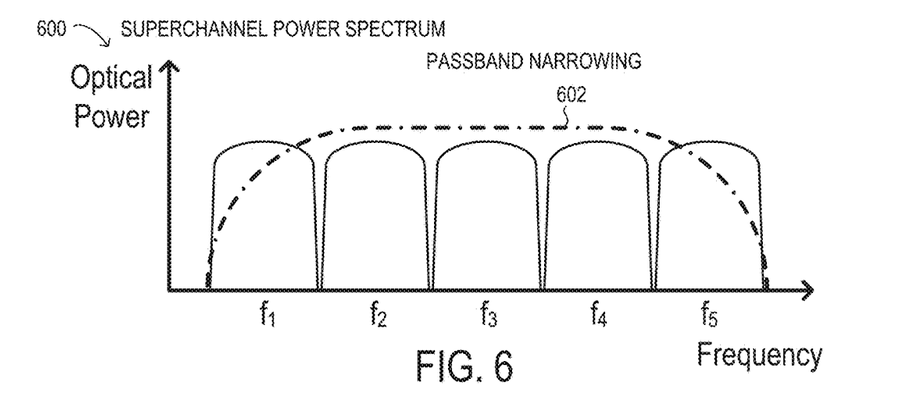

Referring now to FIG. 6, selected elements of an embodiment of a superchannel is shown as superchannel power spectrum 600, which corresponds to subcarriers 402 shown in FIG. 4. Also shown with superchannel power spectrum 600 is a spectral profile of passband narrowing (PBN) 602, which shows how the passband of a superchannel may be narrowed after passing through certain nodes, such as ROADMs or bandpass filters. As shown, passband narrowing 602 may particularly affect edge subcarriers, shown at frequencies $f_1$ and $f_5$ in superchannel power spectrum 600.

Figure 7:
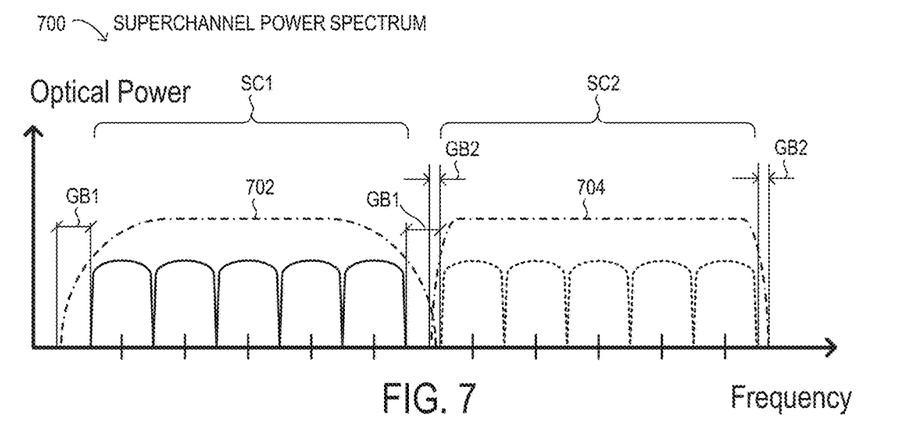

Referring now to FIG. 7, selected elements of an embodiment of a superchannel is shown as superchannel power spectrum 700, which depicts two superchannels, SC1 and SC2, that have been spectrally concatenated to form a single superchannel. In superchannel power spectrum 700, it may be assumed that superchannel SC1 is transmitted through a total of 6 ROADM nodes, while superchannels SC1 and SC2 are transmitted together for 3 of the 6 ROADM nodes. As a result, superchannel SC1 experiences greater passband narrowing (PBN) 702, while superchannel SC2 experiences smaller PBN 704, as shown. Based on the respective PBN 702, 704, superchannel SC1 may be allocated a wider guardband GB1 to avoid PBN 702, while superchannel SC2 may be allocated a narrower guardband GB2 to avoid PBN 704. Between superchannel SC1 and superchannel SC2, the wider guardband GB1 may be used to avoid both PBN 702 and 704.

For superchannel power pre-emphasis based on transmission criteria, as disclosed herein, a guardband may be determined for each superchannel transmitted based on a number of ROADMs in an optical network path over which the superchannels are transmitted. Based on the transmission arrangement of the superchannels, a total guardband between individual superchannels, as well as edge guardbands for the aggregate superchannels, may then be determined for the multiple superchannels transmitted together. Then, based on the guardbands determined, an amount of power pre-emphasis may be determined.

The determination of the guardbands may be made based on different criteria. A minimum guardband or no guardband may be used in certain instances in which power pre-emphasis is not used. A desired level of OSNR margin that may depend on an optical reach of a given transmission may also determine the width of the guardband used. The OSNR margin is the difference between the allocated OSNR of optical signals transmitted over an optical path and the OSNR at the receiver that results in a given BER. Typically, a fixed optical network is designed such that the transmission of an optical signal traveling the longest path within the optical network is ensured. Thus, a specific OSNR value may be allocated during system design to accommodate for the longest path that carries an optical signal. Furthermore, some reserve OSNR (the OSNR margin) may be allocated to withstand unexpected system variations that may occur. Because the allocated OSNR typically decreases during transmission, the total OSNR margin may accordingly be defined as a difference between the allocated OSNR value and the received OSNR value. As a result, for shorter reach distances, a large OSNR margin may exist and may make the use of narrower guardbands acceptable, because OSNR penalties due to such narrower guardbands can be compensated by the large OSNR margin. Thus, in summary, for shorter reach distances, larger OSNR margins may exist and narrower guardbands may be acceptable, while for longer reach distances, smaller OSNR margins may exist and wider guardbands may be desirable. Furthermore, an amount of power pre-emphasis may depend upon the spectral width of the guardband selected. For example, larger power pre-emphasis values may be used with larger guardbands, in different embodiments.

For certain optical transport network, various values used for superchannel power pre-emphasis based on transmission criteria, as disclosed herein, may be pre-calculated, for example, based on fixed optical paths and network nodes that do not change. For example, a guardband may be precalculated for each ROADM node in an optical transport network. Guardband values for various reach distances may be pre-calculated for an optical transport network. A level of power pre-emphasis, or power adjustment, for each subcarrier for a given guardband value may be pre-calculated. The pre-calculated values may be stored in advance and retrieved for network parameterization, as desired, for example using database 304 (see FIG. 3), when a given network transmission path is provisioned.

Specifically, in superchannel power spectrum 700, guardband GB1 may represent an additional guardband that is greater than a minimum or zero guardband for transmitting superchannels SC1 and SC2 over an optical path. The minimum guardband value may be determined based on looking up pre-calculated values. For example, Table 1 shows an example of pre-calculated values for the minimum guardband based on a number of ROADM nodes in an optical path.

TABLE 1

Pre-calculated minimum guardband values versus number of ROADM nodes

| Number of ROADM nodes | Minimum Guardband [GHz] |
| --- | --- |
| 2 | 6.25 |
| 5 | 12.5 |
| 10 | 37.5 |

For other values not explicitly listed in Table 1, such as 6 ROADM nodes, the nearest minimum guardband values listed in Table 1 may be used, such as for 5 ROADM nodes, in some embodiments. In some embodiments, the minimum guardband values may be extrapolated from Table 1 based on a linear relationship. In embodiments of optical networking in a flex-grid with flexible allocation of optical bandwidth per subcarrier, a spectral width of the guardband may be chosen based on the definitions promulgated by the Telecommunication Standardization Sector of the International Telecommunication Union (ITU-T). For example, a flexible DWDM grid definition is given by ITU-T Recommendation G.694.1, in which the allocated guardband can be an integer number of 12.5 GHz, where 12.5 is the spectral slot width granularity in GHz. The allowed frequency slots according to ITU-T G.694.1 have a nominal central frequency in THz defined by: 193.1+(n×0.00625), where n is a positive or negative integer including 0, and 0.00625 is the nominal central frequency granularity in THz. In some cases, based on the central frequency allocation and the spectral width of the superchannel, 6.25 GHz may remain unallocated and may serve as the guardband. Therefore, for other number of ROADM nodes not listed in Table 1, either the nearest smallest guardband shown or the next possible guardband in multiples of 12.5 GHz may be chosen.

Additionally, the reach of the optical path may also be used to estimate the additional guardband used for a desired level of OSNR margin, as listed in Table 2.

TABLE 2

Pre-calculated additional guardband values versus reach for different OSNR margins

| Reach [km] | Additional Guardband [GHz] |
| --- | --- |
| 100 | 6.25 |
| 200 | 12.5 |
| 300 | 37.5 |

In Table 2, the additional guardband may be selected based on an unused OSNR margin for a given reach. The additional guardband may be used cumulatively with the minimum guardband, such that a maximum value of the minimum guardband and the additional guardband is applied to the superchannel. Because the OSNR margin is calculated for a maximum possible reach, an unused or reserve OSNR margin may be present and may be used to further optimize the additional guardband. So for example in Table 2, for 100 km reach, a higher OSNR margin may remain and the additional guardband may be a smaller value, while for 300 km reach, a much smaller OSNR margin may remain and the additional guardband is a larger value to ensure that the smallest possible OSNR penalties due to PBN and fiber nonlinearity (NL) are observed.

Then, as shown in Table 3, a power pre-emphasis condition may be determined based on the guardband selected based on Tables 1 and 2.

TABLE 3

Power pre-emphasis condition

| Guardband | Power Pre-Emphasis |
|---|---|
| zero or minimum | NO |
| additional | YES |

When the power pre-emphasis condition is YES in Table 3, then the launch power of each subcarrier may be determined using pre-calculated values in Table 4 for power pre-emphasis for a given superchannel having 5 subcarriers.

TABLE 4

Pre-calculated power pre-emphasis values versus guardband

| GB [GHz] | $P_1$ [dBm] | $P_2$ [dBm] | $P_3$ [dBm] | $P_4$ [dBm] | $P_5$ [dBm] |
|---|---|---|---|---|---|
| 12.5 | −1.0 | −0.35 | 0 | −0.35 | −1.0 |
| 37.5 | −1.5 | −0.70 | 0 | −0.70 | −1.5 |
| 62.5 | −1.5 | −0.55 | 0 | −0.55 | −1.5 |

As with Tables 1 and 2, the values in Table 4 may be determined using various methods for other values of guardband not listed, such as last minimum values or by extrapolation. It will be understood that the values in Tables 1-4, as well as the assumption of 5 subcarriers per superchannel, have been used as example values for descriptive clarity, and that in other embodiments, different values and different numbers of values may be used.

In this manner, when the multiple superchannels are to be transmitted over the optical transport network, the guardband for each superchannel may be calculated, along with the total guardband between superchannels. Based on the actual guardband values used, the power pre-emphasis values may be determined and applied, for example, at a transmitter. Then, during transmission of the superchannel, the adjusted power values may be monitored and controlled, for example, using feedback control.

Figure 8:
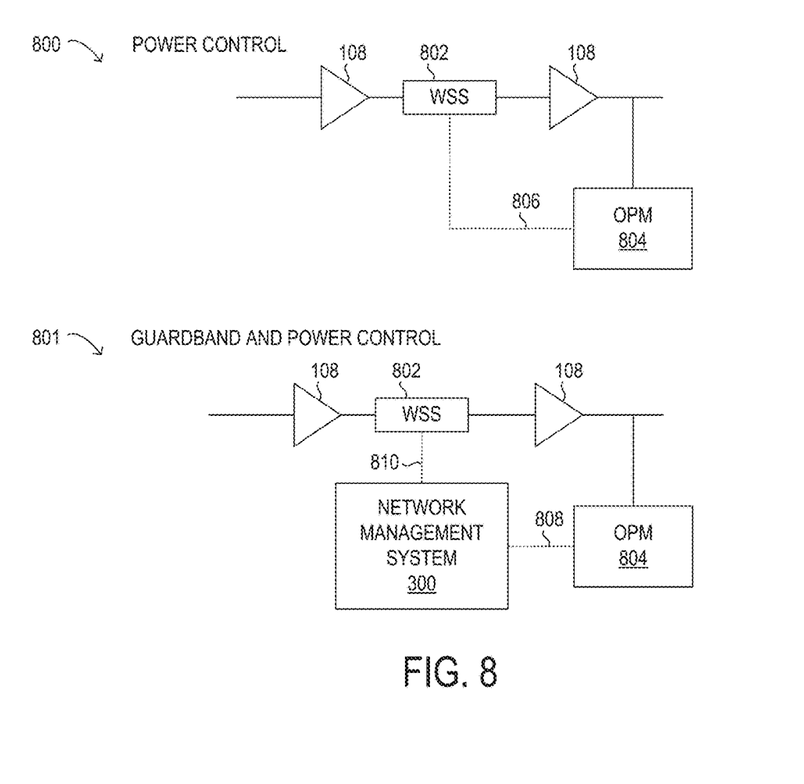
FIG. 8 is a block diagram of selected elements of an embodiment of power control circuits.

Referring now to FIG. 8, a block diagram of selected elements of an embodiment of a power control 800 and a guardband and power control 801 are shown. Power control 800 may be implemented in optical transport network 101, as desired, where amplifiers 108 are placed on either side of WSS 802. Optical power monitoring (OPM) 804 may monitor downstream power for each subcarrier and may indicate these power levels to WSS 802 via control link 806. Then, WSS 802 may attenuate one or more subcarriers to maintain the desired power pre-emphasis values. In this manner, power control 800 shows feedback control for fine adjustment of power pre-emphasis in optical transport network 101.

In FIG. 8, guardband and power control 800 may be implemented in optical transport network 101, as desired, where amplifiers 108 are placed on either side of WSS 802. Optical power monitoring (OPM) 804 may monitor downstream power as well as effective bandwidth for each subcarrier and may indicate these values to network management system 300 via control link 808. When the monitored bandwidth is less than a desired bandwidth for a superchannel (or concatenations of superchannels), network management system 300 may be enabled to detect that PBN has affected the bandwidth and may instruct WSS 802 to allocated a guardband for the superchannel via control link 810. The guardband may be determined by network management system 300 to minimize PBN or to maximize reach of the superchannel or both. Then, WSS 802 may implement the selected guardband and may further attenuate one or more subcarriers to maintain or set desired power pre-emphasis values.

Figure 9:
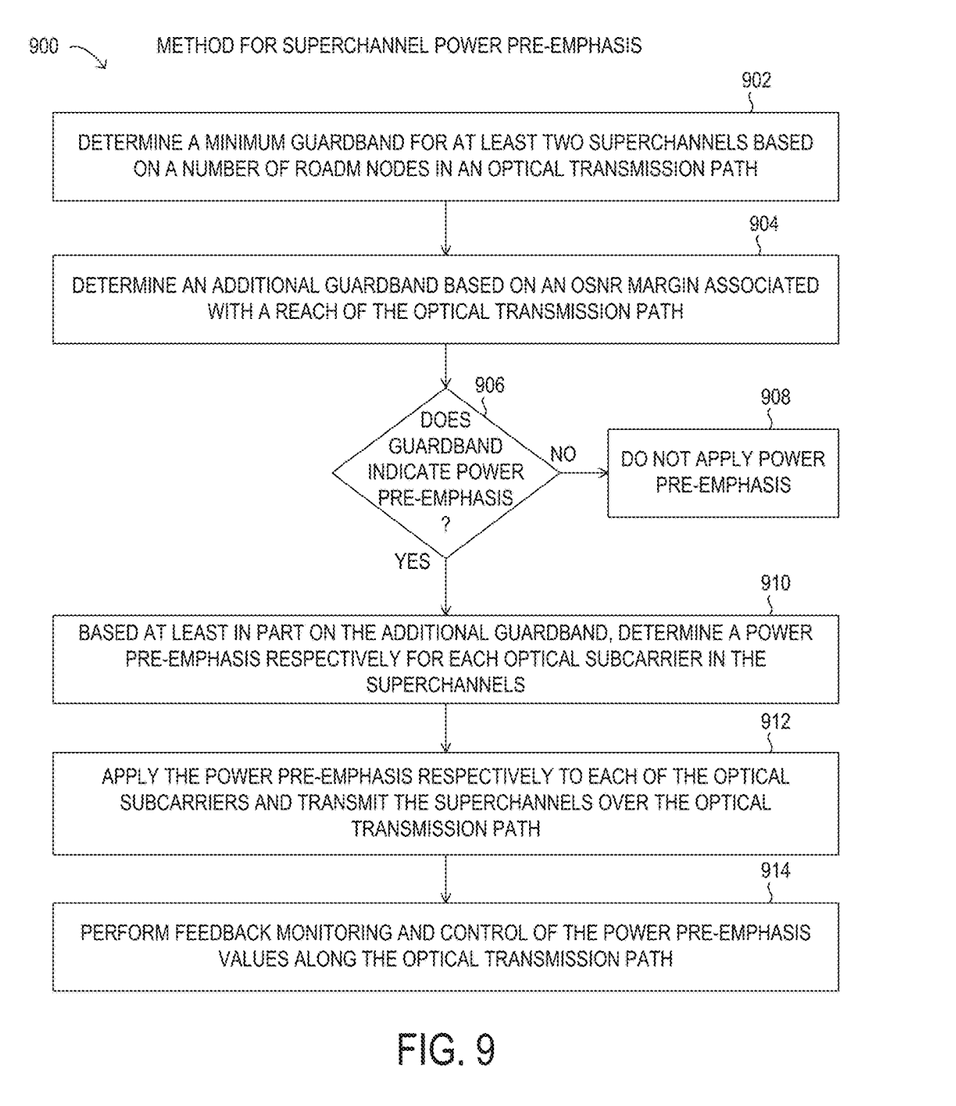
FIG. 9 is a flow chart of selected elements of a method for superchannel power pre-emphasis based on transmission criteria.

Referring now to FIG. 9, a block diagram of selected elements of an embodiment of method 900 for superchannel power pre-emphasis based on transmission criteria, as described herein, is depicted in flowchart form. Method 900 may be performed using network management system 300. It is noted that certain operations described in method 900 may be optional or may be rearranged in different embodiments.

Method 900 may begin at step 902 by determining a minimum guardband for at least two superchannels based on a number of ROADM nodes in an optical transmission path. At step 904, an additional guardband may be determined based on an OSNR margin associated with a reach of the optical transmission path. At step 906, a decision may be made whether the guardband indicates that power pre-emphasis should be applied. When the result of step 906 is NO and no power pre-emphasis should be applied, power pre-emphasis is not applied at step 908. When the result of step 906 is YES and power pre-emphasis is applied, at step 910, based at least in part on the additional guardband, a power pre-emphasis may be respectively determined for each optical subcarrier in the superchannels. At step 912, the power pre-emphasis may be respectively applied to each of the optical subcarriers and the superchannels may be transmitted over the optical transmission path. At step 914, feedback monitoring and control of the power pre-emphasis values may be performed along the optical transmission path.

As disclosed herein, methods and systems for superchannel power pre-emphasis based on transmission criteria may determine a guardband used when transmitting multiple superchannels over an optical transport network. The guardband values may depend on various transmission criteria, such as a reach distance for the superchannels and a number of ROADM nodes over a given optical path. An amount of power pre-emphasis for each superchannel may then be determined based on the actual guardband values used. Certain values used for superchannel power pre-emphasis based on transmission criteria may be pre-calculated and stored in advance.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for superchannel power pre-emphasis based on transmission criteria, the method comprising:
for at least two superchannels being transmitted over an optical transmission path, determining a minimum guardband for the superchannels, the minimum guardband being respectively correlated with a number of reconfigurable optical add-drop multiplexers (ROADM) nodes in the optical transmission path;
determining an additional guardband respectively correlated with a reach of the optical transmission path;
when the additional guardband is greater than the minimum guardband:
determining a power pre-emphasis respectively for each optical subcarrier in the superchannels, the power pre-emphasis being respectively correlated with guardband values;
applying the power pre-emphasis respectively to each of the optical subcarriers, including modifying an optical power level for at least some of the optical subcarriers; and
after applying the power pre-emphasis, transmitting the superchannels over the optical transmission path.

2. The method of claim 1, further comprising:
when the additional guardband is less than or equal to the minimum guardband, transmitting the superchannels over the optical transmission path without applying power pre-emphasis.

3. The method of claim 1, wherein the additional guardband is respectively correlated with an optical signal-to-noise ratio (OSNR) margin for the superchannels over the optical transmission path.

4. The method of claim 1, further comprising:
precalculating values for the minimum guardband versus the number of ROADM nodes; and
storing the values precalculated for the minimum guardband in a repository,
wherein determining the minimum guardband further comprises:
retrieving the values precalculated for the minimum guardband from the repository.

5. The method of claim 1, further comprising:
precalculating values for the additional guardband versus the reach of the optical transmission path; and
storing the values precalculated for the additional guardband in a repository,
wherein determining the additional guardband further comprises:
retrieving the values precalculated for the additional guardband from the repository.

6. The method of claim 1, further comprising:
precalculating values for the power pre-emphasis versus the guardband values for each of the optical subcarriers; and
storing the values precalculated for the power pre-emphasis in a repository,
wherein determining the power pre-emphasis further comprises:
retrieving the values precalculated for the power pre-emphasis from the repository.

7. The method of claim 1, wherein transmitting the superchannels over the optical transmission path includes:
adding the additional guardband to the bandwidth of the superchannels.

8. The method of claim 1, further comprising:
monitoring each optical subcarrier along the optical transmission path to determine a monitored bandwidth; and
when the monitored bandwidth for a first optical subcarrier is impacted by passband narrowing, adjusting the minimum guardband based on the monitored bandwidth.

9. A network management system for superchannel power pre-emphasis based on transmission criteria, the network management system comprising:
a processor enabled to access a memory media storing instructions executable by the processor to:
for at least two superchannels being transmitted over an optical transmission path, determine a minimum guardband for the superchannels, the minimum guardband being respectively correlated with a number of reconfigurable optical add-drop multiplexers (ROADM) nodes in the optical transmission path;
determine an additional guardband respectively correlated with a reach of the optical transmission path;
when the additional guardband is greater than the minimum guardband:
determine a power pre-emphasis respectively for each optical subcarrier in the superchannels, the power pre-emphasis being respectively correlated with guardband values;
apply the power pre-emphasis respectively to each of the optical subcarriers, including modifying an optical power level for at least some of the optical subcarriers; and
after applying the power pre-emphasis, transmit the superchannels over the optical transmission path.

10. The network management system of claim 9, further comprising instructions to:
when the additional guardband is less than or equal to the minimum guardband, transmit the superchannels over the optical transmission path without applying power pre-emphasis.

11. The network management system of claim 9, wherein the additional guardband is respectively correlated with an optical signal-to-noise ratio (OSNR) margin for the superchannels over the optical transmission path.

12. The network management system of claim 9, further comprising instructions to:
precalculate values for the minimum guardband versus the number of ROADM nodes; and
store the values precalculated for the minimum guardband in a repository,
wherein the instructions to determine the minimum guardband further comprise instructions to:
retrieve the values precalculated for the minimum guardband from the repository.

13. The network management system of claim 9, further comprising instructions to:
precalculate values for the additional guardband versus the reach of the optical transmission path; and
store the values precalculated for the additional guardband in a repository,
wherein the instructions to determine the minimum guardband further comprise instructions to:
retrieve the values precalculated for the additional guardband from the repository.

14. The network management system of claim 9, further comprising instructions to:
precalculate values for the power pre-emphasis versus the guardband values for each of the optical subcarriers; and
store the values precalculated for the power pre-emphasis in a repository, wherein the instructions to determine the minimum guardband further comprise instructions to:
 retrieve the values precalculated for the power pre-emphasis from the repository.

15. The network management system of claim 9, wherein the instructions to transmit the superchannels over the optical transmission path include instructions to:
 add the additional guardband to the bandwidth of the superchanels.

16. The network management system of claim 9, further comprising instructions to:
 monitor each optical subcarrier along the optical transmission path to determine a monitored bandwidth; and
 when the monitored bandwidth for a first optical subcarrier is impacted by passband narrowing, adjust the minimum guardband based on the monitored bandwidth.

* * * * *